(12) United States Patent
Xu et al.

(10) Patent No.: US 10,311,415 B2
(45) Date of Patent: Jun. 4, 2019

(54) DATA BATCH PROCESSING METHOD AND SYSTEM

(71) Applicant: Tencent Technology (Shenzhen) Company Limited, Shenzhen (CN)

(72) Inventors: Zhenyu Xu, Shenzhen (CN); Wa Ye, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 490 days.

(21) Appl. No.: 14/991,753

(22) Filed: Jan. 8, 2016

(65) Prior Publication Data
US 2016/0117656 A1    Apr. 28, 2016

Related U.S. Application Data

(63) Continuation of application No. PCT/CN2015/071049, filed on Jan. 6, 2015.

(30) Foreign Application Priority Data

Jan. 7, 2014    (CN) .......................... 2014 1 0006945

(51) Int. Cl.
G07F 19/00        (2006.01)
G06Q 20/14        (2012.01)
(Continued)

(52) U.S. Cl.
CPC .............. *G06Q 20/14* (2013.01); *G06Q 20/12* (2013.01); *G06Q 20/3274* (2013.01);
(Continued)

(58) Field of Classification Search
CPC ............... G06Q 20/14; G06Q 20/3274; G06Q 20/4014; G06Q 20/3278
(Continued)

(56) References Cited

U.S. PATENT DOCUMENTS

2002/0077978 A1    6/2002    O'Leary et al.
2006/0195397 A1    8/2006    Ganesan et al.
(Continued)

FOREIGN PATENT DOCUMENTS

CN    101231722 A    7/2008
CN    101655950 A    2/2010
(Continued)

OTHER PUBLICATIONS

Tencent Technology, IPRP, PCT/CN2015/071049, Jul. 26, 2016, 4 pgs.

(Continued)

*Primary Examiner* — Rokib Masud
(74) *Attorney, Agent, or Firm* — Morgan, Lewis & Bockius LLP

(57) ABSTRACT

A computer system receives, from a client device, a virtual bill request including user identification information of a user associated with the client device and then activates a virtual bill and associates the virtual bill with the client device, the virtual bill having a predefined effective time period. After receiving data corresponding to one or more items added to the virtual bill within the predefined effective time period through respective close proximity data communication between the client device and one or more respective terminals, the computer system determines a value based on the data corresponding to the one or more items and sends a verification request to the client device. Upon receipt of verification information responsive to the verification request, the computer system initiates a transfer of the value from an account associated with the user in accordance with a determination that the verification information is valid.

20 Claims, 10 Drawing Sheets

(51) Int. Cl.
  *G06Q 20/40* (2012.01)
  *G06Q 20/12* (2012.01)
  *G06Q 20/32* (2012.01)
  *G06Q 30/04* (2012.01)

(52) U.S. Cl.
  CPC ......... *G06Q 20/3278* (2013.01); *G06Q 20/40* (2013.01); *G06Q 20/4014* (2013.01); *G06Q 30/04* (2013.01)

(58) Field of Classification Search
  USPC ...................................................... 705/16, 34
  See application file for complete search history.

(56) References Cited

U.S. PATENT DOCUMENTS

2009/0182634 A1* 7/2009 Park ....................... G06Q 20/20
                                                    705/14.36
2010/0331043 A1* 12/2010 Chapman ............... G01C 21/20
                                                    455/556.1
2011/0320291 A1* 12/2011 Coon ..................... G06Q 20/20
                                                    705/16
2013/0024302 A1* 1/2013 Ichimura ................ G06Q 30/01
                                                    705/16

FOREIGN PATENT DOCUMENTS

| CN | 102646238 A | 8/2012 |
| EP | 0921485 A2 | 6/1999 |
| WO | WO 0033227 | 6/2000 |
| WO | WO 2007078190 A | 7/2007 |

OTHER PUBLICATIONS

Tencent Technology, ISRWO, PCT/CN2015/070149, Apr. 21, 2015, 6 pgs.

* cited by examiner

DATA BATCH PROCESSING METHOD AND SYSTEM

RELATED APPLICATIONS

This application is a continuation application of PCT Patent Application No. PCT/CN2015/071049, entitled "DATA BATCH PROCESSING METHOD AND SYSTEM" filed on Jan. 6, 2015, which claims priority to Chinese Patent Application No. 201410006945.4, entitled "Data Batch Processing Method and System," filed on Jan. 7, 2014, both of which are incorporated by reference in their entirety.

TECHNICAL FIELD

The disclosed implementations relate generally to the field of internet, and in particular, to data batch processing method and system.

BACKGROUND

With the rapid development of the internet technology, people are increasingly used to transferring numerical values in the internet, for example, when a user decides to purchase a certain commodity from a merchant, the user needs to transfer out a certain numerical value from the own account of the user to the account of the merchant. However in the existing numerical value transferring scene, the user, after choosing the commodities from different merchants, generally need to respectively perform numerical value transfer operations with respect to different merchants, which may cause multiple numerical value transfer operation, complex process, and is easy to cause mistakes, thus bringing potential safety hazards to the property safety of the user.

SUMMARY

In accordance with some embodiments, a method includes, at a computer system: receiving, from a client device, a virtual bill request, the virtual bill request including user identification information identifying a user associated with the client device; in accordance with the virtual bill request, activating a virtual bill and associating the virtual bill with the client device, the virtual bill having a predefined effective time period; receiving, from the client device, data corresponding to one or more items added to the virtual bill, wherein the one or more items were added to the virtual bill within the predefined effective time period through respective close proximity data communication between the client device and one or more respective terminals; determining a value based on the data corresponding to the one or more items; sending, to the client device, a verification request, wherein the verification request includes the determined value; receiving, from the client device, verification information responsive to the verification request; and in accordance with a determination that the verification information is valid, initiating a transfer of the value from an account associated with the user.

In accordance with some embodiments, a computer system includes memory, one or more processors, and one or more programs, where the one or more programs are stored in the memory and configured to be executed by the one or more processors. The one or more programs include instructions for: receiving, from a client device, a virtual bill request, the virtual bill request including user identification information identifying a user associated with the client device; in accordance with the virtual bill request, activating a virtual bill and associating the virtual bill with the client device, the virtual bill having a predefined effective time period; receiving, from the client device, data corresponding to one or more items added to the virtual bill, wherein the one or more items were added to the virtual bill within the predefined effective time period through respective close proximity data communication between the client device and one or more respective terminals; determining a value based on the data corresponding to the one or more items; sending, to the client device, a verification request, wherein the verification request includes the determined value; receiving, from the client device, verification information responsive to the verification request; and in accordance with a determination that the verification information is valid, initiating a transfer of the value from an account associated with the user.

In accordance with some embodiments, a non-transitory computer readable storage medium stores one or more programs configured for execution by a computer system that includes one or more processors and memory. The one or more programs include instructions for: receiving, from a client device, a virtual bill request, the virtual bill request including user identification information identifying a user associated with the client device; in accordance with the virtual bill request, activating a virtual bill and associating the virtual bill with the client device, the virtual bill having a predefined effective time period; receiving, from the client device, data corresponding to one or more items added to the virtual bill, wherein the one or more items were added to the virtual bill within the predefined effective time period through respective close proximity data communication between the client device and one or more respective terminals; determining a value based on the data corresponding to the one or more items; sending, to the client device, a verification request, wherein the verification request includes the determined value; receiving, from the client device, verification information responsive to the verification request; and in accordance with a determination that the verification information is valid, initiating a transfer of the value from an account associated with the user.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

To describe the technical solutions in the embodiments of the present application or in the prior art more clearly, the following briefly introduces the accompanying drawings required for describing the embodiments of the present application or the prior art. Apparently, the accompanying drawings in the following description show merely some embodiments of the present application, and a person of ordinary skill in the art may still derive other drawings from these accompanying drawings without creative efforts.

DETAILED DESCRIPTION

In order to illustrate the technical solutions in the embodiments of the present application more clearly, further description according to the embodiments will be made with the accompanying drawings. Apparently, the accompanying drawings described hereinafter are merely some embodiments of the present application. Based on the embodiments in the present application, all other embodiments made by a person of ordinary skill in the art without making any creative effort, shall fall within the protection scope of the present application.

The embodiment of the present application provides a data batch processing method and system, capable of improving data processing efficiency and also improving data processing security.

Figure 1:
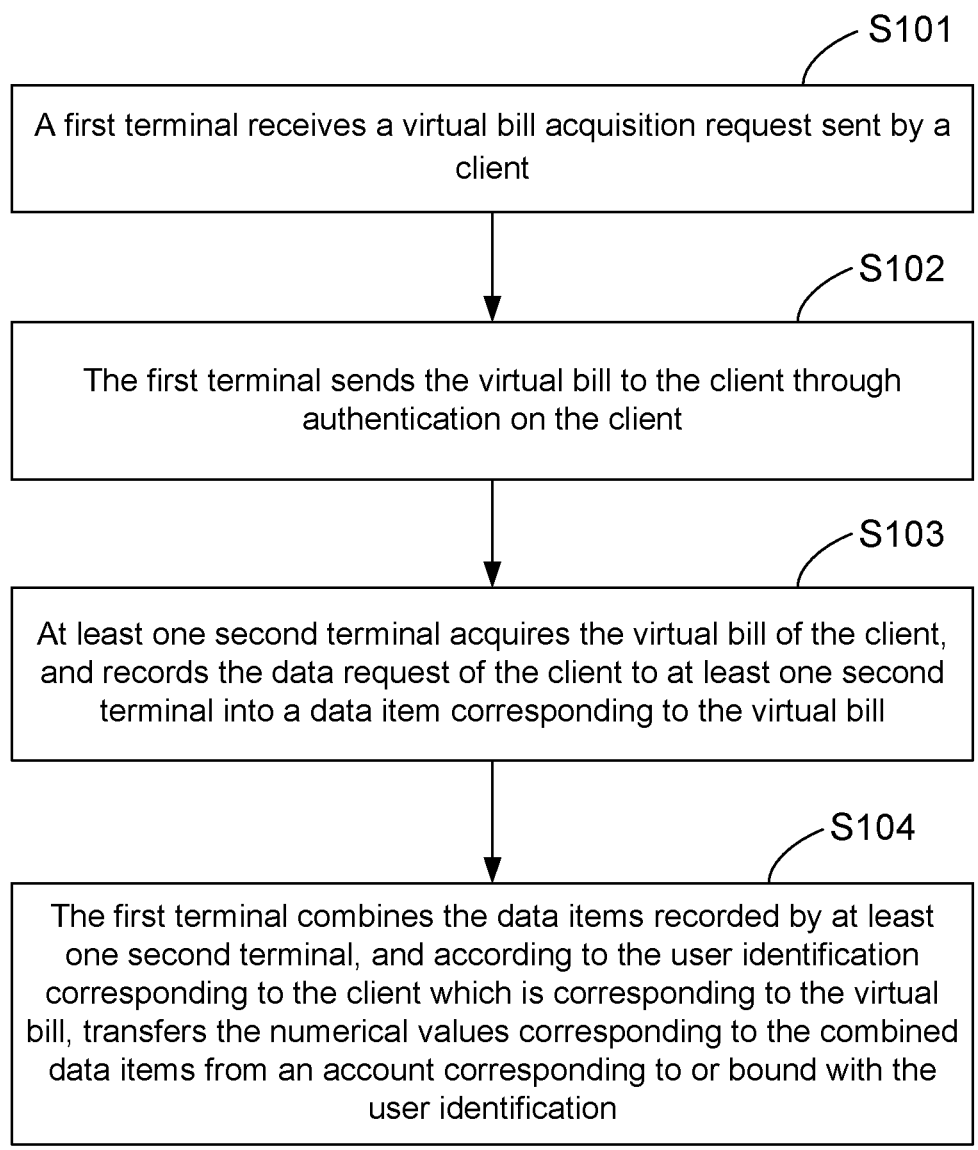
FIG. 1 is a flow chart of a data batch processing method according to an embodiment of the present application.

Referring to FIG. 1, a data batch processing method according to one embodiment of the present application includes the following steps.

Step 101: A first terminal receives a virtual bill acquisition request sent by a client.

The virtual bill in the embodiment is mainly used for registering a user identification corresponding to the client at the first terminal and recording a data request of the client to at least one second terminal, wherein the first terminal and the second terminal may be such terminal equipment as personal computer (PC), personal digital assistant (PDA), tablet PC, mobile phone, laptop computer, and the like. The first terminal and the second terminal may either be the same terminal equipment or different terminal equipments.

At least one second terminal is configured, wherein the inside of each second terminal is registered with commodity information. The commodity information at least includes a commodity identification and a numerical value corresponding to the commodity, wherein the commodity identification may be a commodity name. Each second terminal may register the commodity information through scanning the two-dimensional code or bar-code of the commodity, or through manual inputting the identification code of the commodity. The client may be such portable terminals as mobile phone, PDA, and the like.

The user identification corresponding to the client and registered by the virtual bill at the first terminal is the identification information that may uniquely determine a certain requesting user, for example, username (unique), payment account name, bank card account number, and the like. The data request of the client to at least one second terminal recorded by the virtual bill may include commodity information registered at the second terminal, wherein the commodity information at least includes a commodity identification or a numerical value corresponding to the commodity.

Step 102: The first terminal sends the virtual bill to the client through authentication on the client. In order to ensure the numerical value security of the user, the first terminal, after receiving the virtual bill acquisition request sent by the client, needs to carry out authentication on the client. After the authentication on the client is passed, the first terminal sends a virtual bill to the client of the requesting user.

In concrete implementation, the first terminal may utilize such technologies as bluetooth, near field communication (NFC), Wi-Fi Direct, and the like, to send the virtual bill to the client.

Step 103: At least one second terminal acquires the virtual bill of the client, and records the data request of the client to at least one second terminal into a data item corresponding to the virtual bill.

In concrete implementation, the second terminal may utilize such technologies as bluetooth, NFC, Wi-Fi Direct, and the like, to acquire the virtual bill of the client, and then the second terminal records the data request of the client to itself into the data item corresponding to the virtual bill.

For example, the data request sent by the client to the second terminal includes the name and the corresponding numerical value of a commodity A, then the second terminal, after receiving the data request sent by the client, compares the name and the corresponding numerical value of the commodity A included in the data request sent by the client with the name and the corresponding numerical value recorded by itself, and after the two are confirmed to have no mistakes, records the name and the corresponding numerical value of the commodity A into the data item corresponding to the virtual bill.

Step 104: The first terminal combines the data items recorded by at least one second terminal, and according to the user identification corresponding to the client which is corresponding to the virtual bill, transfers the numerical values corresponding to the combined data items from an account corresponding to or bound with the user identification. In concrete implementation, the user may send a data request to different second terminals through the client according to self demands, wherein each second terminal, after receiving the data request sent by the client, will record the data request sent to itself by the client into the data item corresponding to the virtual bill, and then returns the virtual bill back to the client. The first terminal acquires, through the virtual bill of the client, the data item requested by the user and recorded by each second terminal, combines the data items, and then according to the user identification corresponding to the client that is corresponding to the virtual bill, transfers the numerical values corresponding to the combined data items from the account corresponding to or bound with the user identification.

Figure 2:
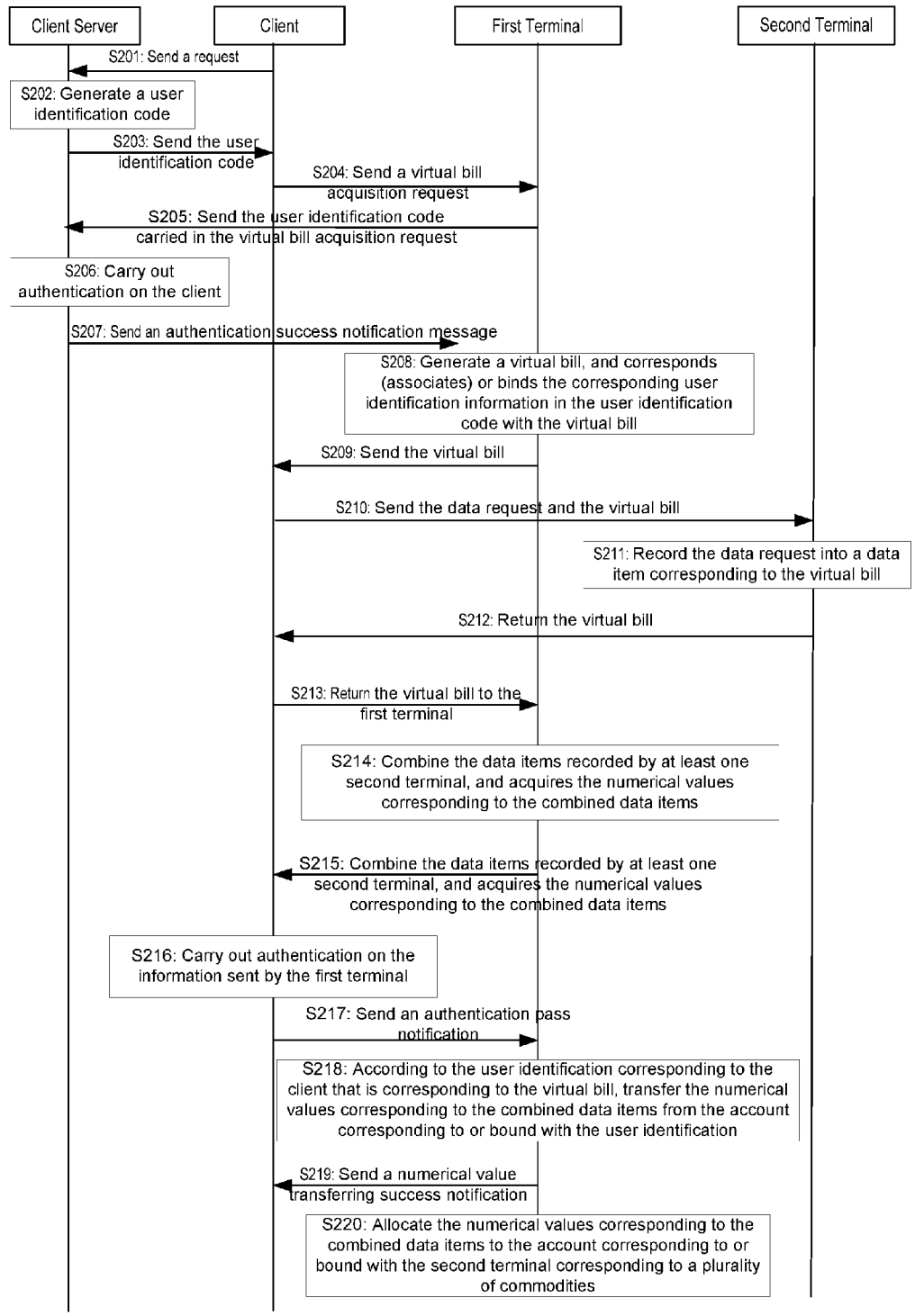
FIG. 2 is a flow chart of a data batch processing method according to another embodiment of the present application.

In the embodiment, the first terminal may combine the data items recorded by at least one second terminal, and transfer the numerical values corresponding to the combined data items from the account corresponding to or bound with the user identification at one time, i.e., carrying out batch numerical value transferring, thus being capable of improving data processing efficiency. In addition, since batch numerical value transferring may be carried out, a process for carrying out verification on the user may be relatively numerous, thus being capable of improving the security, and not increasing operations. For easy understanding, the data batch processing method in the embodiment of the present application is described with reference to one concrete embodiment. Referring to FIG. 2, the data batch processing method of the embodiment includes the following steps.

Step 201: A client sends a request to a client server. The request sent by the client to a client server may carry user identification information, wherein the user identification may be identification information that may uniquely determine a certain requesting user, for example, username (unique), payment account name, bank card account number, and the like.

S202: The client server generates a user identification code according to the user identification information. The client server generates the user identification code according to the user identification information, wherein the user identification code includes a two-dimensional code. The client, after storing the two-dimensional code, can offline provide the two dimensional code to the first terminal, so as to realize offline numerical value transferring, wherein the two dimensional code, which is also called as two-dimensional bar-code, is a bar-code having readability expanded on a one-dimensional bar-code. An apparatus scans the two dimensional code, and may acquire the information included in the two-dimensional code through the binary data recorded in the two-dimensional code. Compared with the one-dimensional code, the two-dimensional code can record more complicated data, for example, pictures, network links, and the like.

Step 203: The client server sends the user identification code to the client.

Step 204: The client sends a virtual bill acquisition request to the first terminal. The virtual bill in the embodiment is mainly used for registering a user identification corresponding to the client at the first terminal and recording a data request of the client to at least one second terminal, wherein the first terminal and the second terminal may be such terminal equipment as personal computer (PC), personal digital assistant (PDA), tablet PC, mobile phone, laptop computer, and the like. The first terminal and the second terminal may either be the same terminal equipment or different terminal equipments. At least one second terminal is configured, wherein the inside of each second terminal is registered with commodity information. The commodity information at least includes a commodity identification and a numerical value corresponding to the commodity, wherein the commodity identification may be a commodity name. Each second terminal may register the commodity information through scanning the two-dimensional code or bar-code of the commodity, or through manual inputting the identification code of the commodity. The client may be such portable terminals as mobile phone, PDA, and the like. The user identification corresponding to the client and registered by the virtual bill at the first terminal is the identification information that may uniquely determine a certain requesting user, for example, username (unique), payment account name, bank card account number, and the like. The data request of the client to at least one second terminal recorded by the virtual bill may include commodity information registered at the second terminal, wherein the commodity information at least includes a commodity identification or a numerical value corresponding to the commodity.

In addition, the virtual bill acquisition request includes the user identification code corresponding to the client.

Step 205: The first terminal sends the user identification code carried in the virtual bill acquisition request to the client server, so as to carry out authentication on the client.

In order to ensure the numerical value security of the user, the first terminal, after receiving the virtual bill acquisition request sent by the client, extracts the user identification code carried in the virtual bill acquisition request, and sends the user identification code to the client server, so that the client server carries out authentication on the client.

Step 206: The client server carries out authentication on the client according to the user identification code sent by the first terminal. The client server compares the user identification code corresponding to the client sent by the first terminal with the self-generated user identification code corresponding to the client so as to realize authentication on the client.

Step 207: An authentication success notification message is sent to the first terminal. The client server, after the authentication on the client is passed, sends the authentication success notification message to the first terminal.

Step 208: The first terminal generates a virtual bill, and corresponds (associates) or binds the corresponding user identification information in the user identification code with the virtual bill. When the first terminal receives the authentication success notification message sent by the client server, the first terminal generates the virtual bill that is uniquely identified in the first terminal, and corresponds (associates) or binds the corresponding user identification information in the user identification code with the generated virtual bill. The so-called corresponding, for example, refers to the payment account identified by the user identification information itself, and the so-called binding, for example, refers to the bank card account bound with the user identification information. In addition, the first terminal or a corresponding server thereof further, according to the virtual bill acquisition request, stores the user identification corresponding to the client, and the user identification corresponding to the first terminal. The virtual bill registers at least one of the time of the user identification and a key used during a registration process.

Step 209: The first terminal sends the generated virtual bill to the client. In concrete implementation, the first terminal utilizes such technologies as bluetooth, near field communication (NFC), Wi-Fi Direct, and the like, to send the virtual bill to the client.

Step 210: The client sends the data request and the virtual bill to the second terminal. The data request sent by the client to the second terminal includes commodity information registered at the second terminal, wherein the commodity information at least includes a commodity identification and a numerical value corresponding to the commodity. In concrete implementation, the client may utilize such technologies as bluetooth, NFC, Wi-Fi Direct, and the like, to send the data request and the virtual bill to the second terminal.

Step 211: The second terminal records the data request into a data item corresponding to the virtual bill. The second terminal receives the data request and the virtual bill sent by the client, and records the data request sent by the client into the data item corresponding to the virtual bill. For example, the data request sent by the client to the second terminal includes the name and the corresponding numerical value of a commodity A, then the second terminal, after receiving the data request sent by the client, compares the name and the corresponding numerical value of the commodity A included in the data request sent by the client with the name and the corresponding numerical value recorded by itself, and after the two are confirmed to have no mistakes, records the name and the corresponding numerical value of the commodity A into the data item corresponding to the virtual bill. In addition, the information of a certain commodity recorded in the virtual bill further includes the related information of the second terminal corresponding to the commodity, for example, a terminal identification that uniquely identifies the second terminal.

Step 212: The second terminal, after the corresponding data item is recorded in the virtual bill, returns the virtual bill back to the client. The second terminal, after recording the data request sent by the client to the virtual bill, sends the virtual bill to the client. The client may continuously send the data request and the virtual bill to other second terminals.

Step 213: After the user finishes choosing, the virtual bill is returned back to the first terminal. The virtual bill returned back to the first terminal has recorded the data items recorded by all the second terminals to which the client sends the data request.

Step 214: The first terminal combines the data items recorded by at least one second terminal, and acquires the numerical values corresponding to the combined data items. The first terminal combines the numerical values corresponding to a plurality of commodity identifications in the data items recorded by a plurality of second terminals in the virtual bill, and generates the numerical values corresponding to the combined data items.

Step 215: The first terminal sends the commodity identification, the corresponding numerical value thereof, and the numerical value information corresponding to the combined data items to the client for the user to carry out authentication. The first terminal sends the commodity identification of each commodity recorded in the virtual bill, the corresponding numerical value thereof, and the numerical value information corresponding to the combined data items to the client for the user to carry out authentication.

Step 216: The client carries out authentication on the information sent by the first terminal. The user reads the related commodity information displayed at the client, and carries out verification and authentication on the information.

Step 217: After the authentication is passed, the client sends an authentication pass notification to the first terminal.

Step 218: The first terminal, according to the user identification corresponding to the client that is corresponding to the virtual bill, transfers the numerical values corresponding to the combined data items from the account corresponding to or bound with the user identification.

The first terminal, after receiving the authentication pass notification, according to the user identification corresponding to the client that is corresponding to the virtual bill, transfers the numerical values corresponding to the combined data items from the account corresponding to or bound with the user identification, i.e., only one numerical value transferring is required for a plurality of data request sent by the user to different second terminals.

Step 219: The first terminal sends a numerical value transferring success notification to the client.

Step 220: The first terminal allocates the numerical values corresponding to the combined data items to the account corresponding to or bound with the second terminal corresponding to a plurality of commodities. As the information of each commodity recorded in the virtual bill further includes the related information of the second terminal corresponding to the commodity, the first terminal, after transferring the numerical values corresponding to the combined data items from the account corresponding to or bound with the user identification, may further respectively transfer the numerical values to the account corresponding to bound with the second terminal that is corresponding to the commodity according to the related information of the second terminal corresponding to each commodity.

In the embodiment, the first terminal may combine the data items recorded by at least one second terminal, and transfer the numerical values corresponding to the combined data items from the account corresponding to or bound with the user identification at one time, i.e., carrying out batch numerical value transferring, thus being capable of improving data processing efficiency. In addition, since batch numerical value transferring may be carried out, a process for carrying out verification on the user may be relatively numerous, thus being capable of improving the security, and not increasing operations.

Figure 3:
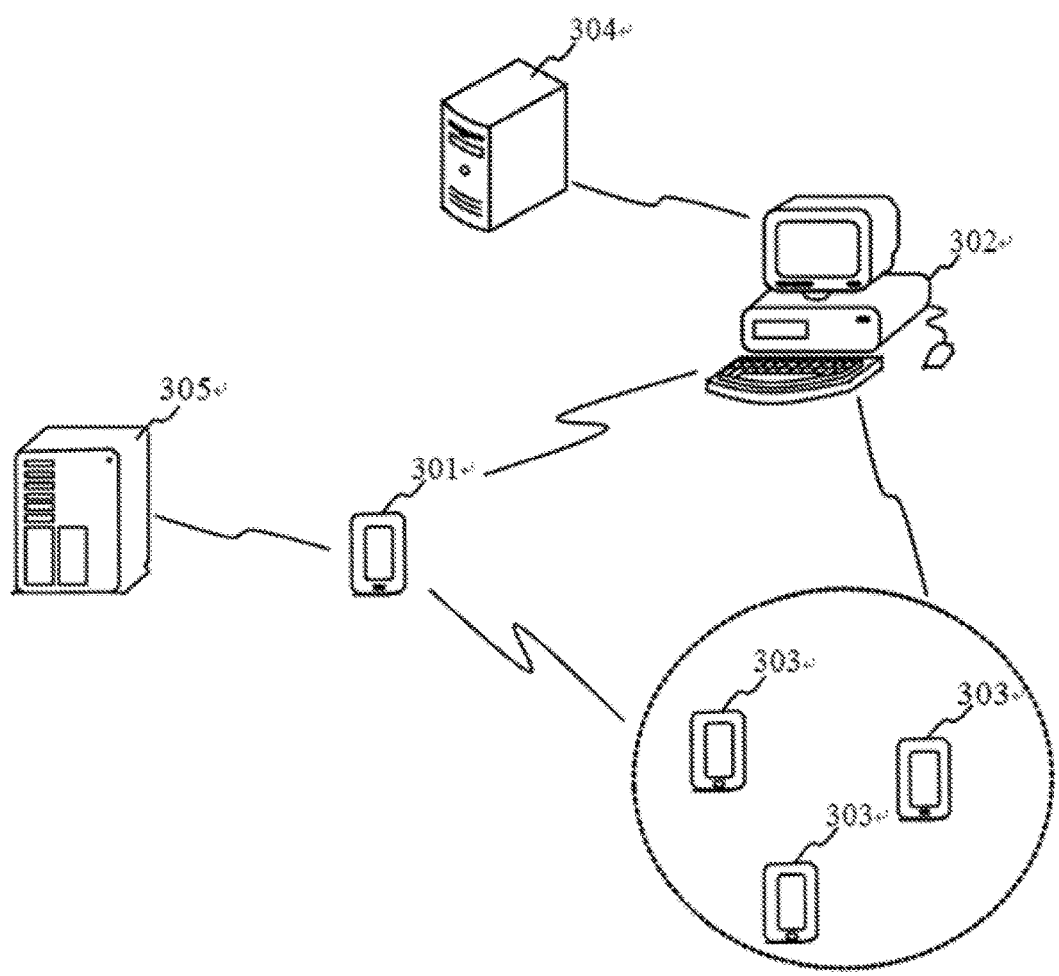
FIG. 3 is a structural block diagram of a data batch processing system according to an embodiment of the present application.

FIG. 3 is a structural block diagram of a data batch processing system according to an embodiment of the present application. As shown in the FIG. 3, the data processing system in the embodiment includes a client 301, a first terminal 302, at least one second terminal 303, a server 304 corresponding to the first terminal and a server 305 corresponding to the client, wherein: the client 301 is used for sending a request to the client server 304, and the request may carry user identification information, wherein the user identification may be identification information that may uniquely determine a certain requesting user, for example, username (unique), payment account name, bank card account number, and the like.

The client server 304 generates a user identification code according to the user identification information, and sends the user identification code to the client 301. The user identification code includes a two-dimensional code. The client 301, after storing the two-dimensional code, can offline provide the two-dimensional code to the first terminal 302, so as to realize offline numerical value transferring, wherein the two dimensional code, which is also called as two-dimensional bar-code, is a bar-code having readability expanded on a one-dimensional bar-code. An apparatus scans the two dimensional code, and may acquire the information included in the two-dimensional code through the binary data recorded in the two-dimensional code. Compared with the one-dimensional code, the two-dimensional code can record more complicated data, for example, pictures, network links, and the like.

Then the client 301 sends a virtual bill acquisition request to the first terminal 302, wherein the virtual bill acquisition request includes the user identification code corresponding to the client.

The virtual bill in the embodiment is mainly used for registering a user identification corresponding to the client 301 at the first terminal 302 and recording a data request of the client 301 to at least one second terminal 303, wherein the first terminal 302 and the second terminal 303 may be such terminal equipment as personal computer (PC), personal digital assistant (PDA), tablet PC, mobile phone, laptop computer, and the like. The first terminal 302 and the second terminal 303 may either be the same terminal equipment or different terminal equipments.

At least one second terminal 303 is configured, wherein the inside of each second terminal is registered with commodity information. The commodity information at least includes a commodity identification and a numerical value corresponding to the commodity, wherein the commodity identification may be a commodity name. Each second terminal may register the commodity information through scanning the two-dimensional code or bar-code of the commodity, or through manual inputting the identification code of the commodity. The client may be such portable terminals as mobile phone, PDA, and the like.

The user identification corresponding to the client 301 and registered by the virtual bill at the first terminal 302 is the identification information that may uniquely determine a certain requesting user, for example, username (unique), payment account name, bank card account number, and the like. The data request of the client 301 to at least one second terminal 303 recorded by the virtual bill may include commodity information registered at the second terminal 303, wherein the commodity information at least includes a commodity identification or a numerical value corresponding to the commodity.

In order to ensure the numerical value security of the user, the first terminal 302, after receiving the virtual bill acquisition request sent by the client 301, extracts the user identification code carried in the virtual bill acquisition request, and sends the user identification code to the client server 305, so that the client server 305 carries out authentication on the client 301. The client server 305, after the authentication on the client 301 is passed, sends an authentication success notification message to the first terminal 302.

When the first terminal 302 receives the authentication success notification message sent by the client server 305, the first terminal 302 generates the virtual bill that is uniquely identified in the first terminal 302, and corresponds (associates) or binds the corresponding user identification information in the user identification code with the generated virtual bill. The so-called corresponding, for example, refers to the payment account identified by the user identification information itself, and the so-called binding, for example, refers to the bank card account bound with the user identification information.

In addition, the first terminal 302 or a corresponding server 304 thereof further, according to the virtual bill acquisition request, stores the user identification corresponding to the client 301, and the user identification corresponding to the first terminal 302. The virtual bill registers at least one of the time of the user identification and a key used during a registration process.

The first terminal 302 sends the generated virtual bill to the client 301. In concrete implementation, the first terminal 302 may utilize such technologies as bluetooth, near field communication (NFC), Wi-Fi Direct, and the like, to send the generated virtual bill to the client 301.

The client 301, after receiving the virtual bill sent by the first terminal 302, sends a data request and a virtual bill to the second terminal 303, wherein the data request sent by the client 301 to the second terminal 303 includes the commodity information registered at the second terminal 303. The commodity information at least includes a commodity identification and a numerical value corresponding to the commodity. In concrete implementation, the client 301 may utilize such technologies as bluetooth, NFC, Wi-Fi Direct, and the like, to send the data request and the virtual bill to the second terminal 303.

The second terminal 303 receives the data request and the virtual bill sent by the client 301, and records the data request sent by the client 301 into the data item corresponding to the virtual bill. For example, the data request sent by the client 301 to the second terminal 303 includes the name and the corresponding numerical value of a commodity A, then the second terminal 303, after receiving the data request sent by the client 301, compares the name and the corresponding numerical value of the commodity A included in the data request sent by the client 301 with the name and the corresponding numerical value recorded by itself, and after the two are confirmed to have no mistakes, records the name and the corresponding numerical value of the commodity A into the data item corresponding to the virtual bill.

In addition, the information of the commodity recorded in the virtual bill further includes the related information of the second terminal 303 corresponding to the commodity, for example, a terminal identification that uniquely identifies the second terminal 303.

The second terminal 303, after recording the data request sent by the client 301 to the virtual bill, sends the virtual bill to the client 301. The client 301 may continuously send the data request and the virtual bill to other second terminals.

After the user finishes choosing, the client 301 returns the virtual bill back to the first terminal 301, wherein the virtual bill returned back to the first terminal 301 has recorded the data items of all the second terminals to which the client sends the data request. The first terminal 302 combines the numerical values corresponding to a plurality of commodity identifications in the data items recorded by a plurality of second terminals in the virtual bill, and generates the numerical values corresponding to the combined data items. Then, the first terminal 302 sends the commodity identification of each commodity recorded in the virtual bill, the corresponding numerical value thereof, and the numerical value information corresponding to the combined data items to the client 301 for the user to carry out authentication.

When receiving an authentication pass notification sent by the client 301, the first terminal 302, according to the user identification corresponding to the client that is corresponding to the virtual bill, transfers the numerical values corresponding to the combined data items from the account corresponding to or bound with the user identification, i.e., only one numerical value transferring is required for a plurality of data request sent by the user to different second terminals. After the numerical value transferring is finished, the first terminal 302 sends a numerical value transferring success notification to the client 301.

Finally the first terminal 301, according to the related information of the second terminal corresponding to each commodity recorded in the virtual bill, respectively transfers the numerical values to the account corresponding to or bound with the second terminal corresponding to each commodity. In the embodiment, the first terminal may combine the data items recorded by at least one second terminal, and transfer the numerical values corresponding to the combined data items from the account corresponding to or bound with the user identification at one time, i.e., carrying out batch numerical value transferring, thus being capable of improving data processing efficiency. In addition, since batch numerical value transferring may be carried out, a process for carrying out verification on the user may be relatively numerous, thus being capable of improving the security, and not increasing operations.

Figure 4:
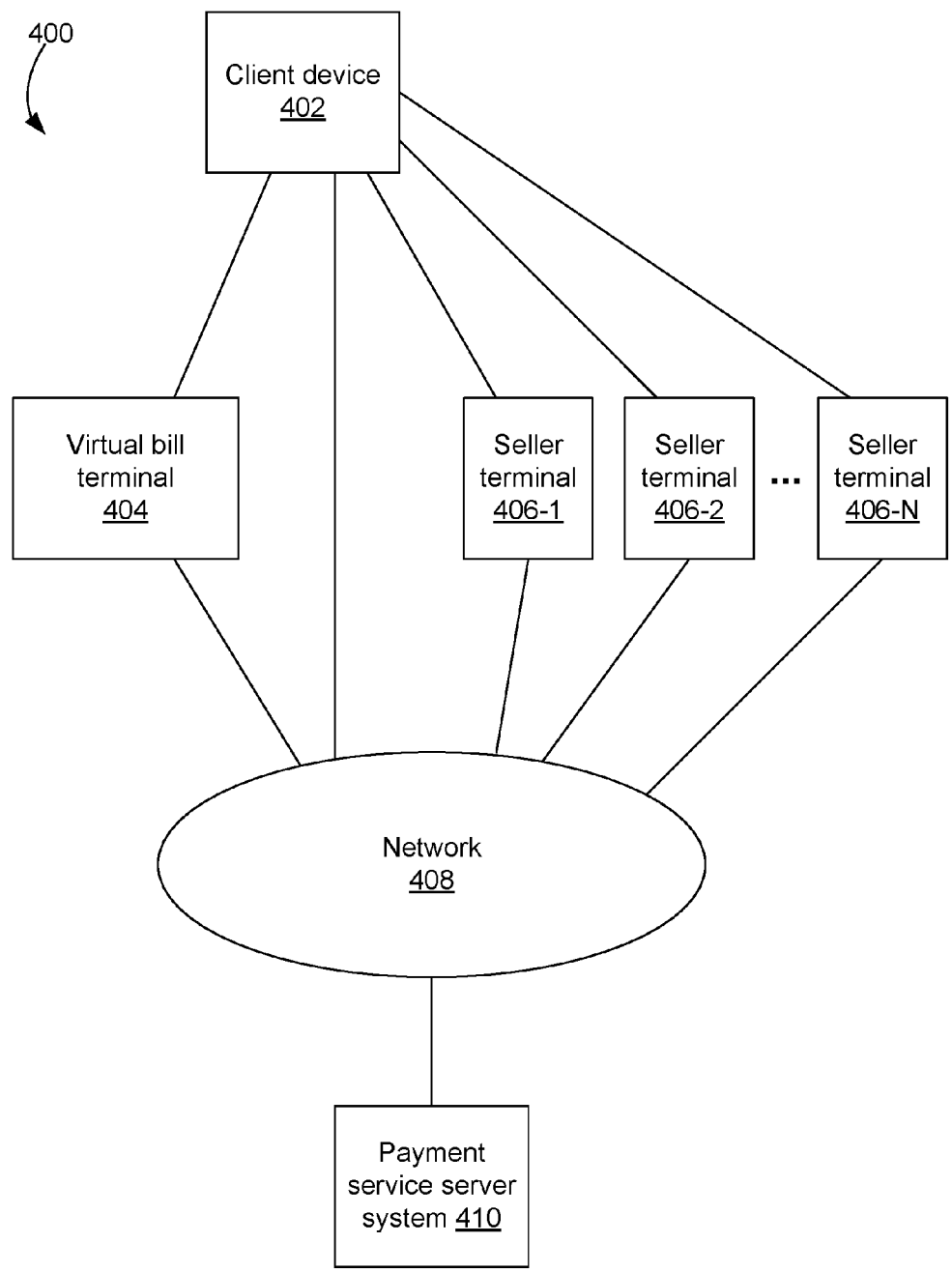
FIG. 4 is a block diagram illustrating a network environment according to some embodiments.

FIG. 4 illustrates a network environment 400 in accordance with some embodiments. The network environment 400 includes a client device 402, a virtual bill terminal 404, one or more seller terminals 406-1 thru 406-N, a network 408, and a payment service server system 410. The network 408 may be any of a variety of networks, including local area networks (LAN), wide area networks (WAN), wireless networks, wired networks, the Internet, or a combination of such networks.

The client device 402 exchanges data with the virtual bill terminal 404 and the seller terminals 406. In some embodiments, the client device 402 is any of a variety of portable devices, such as a mobile phone, smartphone, tablet, multimedia player device, portable gaming device, or notebook computer.

The client device 402 is capable of data communications (e.g., receiving data, sending data, providing data). The client device 402 can receive and send data through communications with other devices and computer systems (e.g., virtual bill terminal 404, seller terminals 406, payment service server system 410). The communications can be direct device-to-device communication or through the network 408. Communication through network 408 may be performed using any suitable protocol or technology (e.g., Wi-Fi, TCP/IP, 3G, 4G, LTE, etc.). Direct device-to-device communication may be performed by the client device 402 and another device (e.g., virtual bill terminal 404, seller terminal 406) in close proximity. The maximum allowable distance between the client device 402 and the another device (i.e., the maximum close-proximity communication range) is dependent on the particular communication technique or technology being used to perform the communication. In some embodiments, the direct communication is performed using any suitable close-proximity communication technique or technology, such as near field communication, Wi-Fi (e.g., Wi-Fi Direct), Bluetooth, and barcode scanning. In the case of barcode scanning, a source device provides data by displaying a barcode (e.g., on a display device of the source device) for a destination device to scan, and the destination device receives the data by scanning the barcode displayed on the source device (e.g., with an image acquisition device, such as a camera, or a barcode scanner). The barcode may be one-dimensional or two-dimensional (e.g., QR code).

A virtual bill terminal 404 opens (e.g., activates) and closes (e.g., deactivates) virtual bills in conjunction with clients 402. A client device 402 communicates with the virtual bill terminal 404 directly (e.g., in close proximity) to activate a virtual bill associated with the client device 402, and later communicates with the virtual bill terminal 404 to close the virtual bill. In some embodiments, the virtual bill is like a virtual shopping cart or invoice, in which purchases from multiple sellers can be recorded. When the virtual bill is closed, the purchases are paid for in one consolidated amount.

In some embodiments, the virtual bill terminal 404 is any of a variety of computing devices, such as a mobile phone, smartphone, tablet, terminal computer, desktop or notebook computer, and so on.

The seller terminals 406 record purchase data to virtual bills on client devices 402. A client device 402 communicates with a seller terminal 406 directly (e.g., in close proximity) to receive purchase data to be recorded in a virtual bill associated with the client device 402.

In some embodiments, the seller terminal 406 is any of a variety of computing devices, such as a tablet, terminal computer, display terminal, and so on.

A respective seller terminal 406 is associated with a seller. In some embodiments, the seller terminal 406 includes data for a respective item. For example, the seller terminal 406 may be a device on the product shelves that store and display information for a particular item on the shelves, and which can provide data for that particular item to a client device 402 to be recorded in a virtual bill. In some other embodiments, the seller terminal 406 is a terminal where the seller can consolidate the user's purchases with that seller (as in a checkout counter at a store) and the data for the user's consolidated purchases with that seller can be provided to a client device 402 to be recorded in a virtual bill.

The payment service server system 410 hosts a payment service that processes payments and performs operations related to virtual bills. In some embodiments, the payment service server system 410 is a server system for a payments platform that is a part of a social networking service. In some embodiments, the payment service server system 410 generates user identification information, which is used for the opening of virtual bills, for client devices 402; the user identification information identifies the user account within the payment service. The payment service server system 410 processes the opening and closing of virtual bills and processes payments for purchases recorded in virtual bills.

In some embodiments, the network environment 400 facilities an enhanced shopping experience for users. A virtual bill request, including user identification information, is generated on a client device 402 either locally or in conjunction with the payment service server system 410. The client device 402 makes a request to the virtual bill terminal 404 to open a virtual bill. The virtual bill terminal 404 opens a virtual bill and associates the virtual bill with the client device 402. As the user makes purchases with different sellers, the client device 402 and seller terminals 406 communicate to record purchases in the virtual bill (e.g., on an item-by-item basis, on a seller-by-seller basis). When the user has finished shopping, the client device 402 makes a request to the virtual bill terminal 404 to close the virtual bill. The payment service server system 410 transfer the amount of the purchases recorded in the virtual bill from an account of the user, which server as the user's payment for the purchases. In some embodiments, the payment service server system 410 also distributes the amounts of the purchases to the respective sellers. Thus, the user's experience is enhanced by consolidating the multiple payments the user makes for the purchases into one payment, as well as saving the user the time of making multiple payments with the various sellers.

Figure 5:
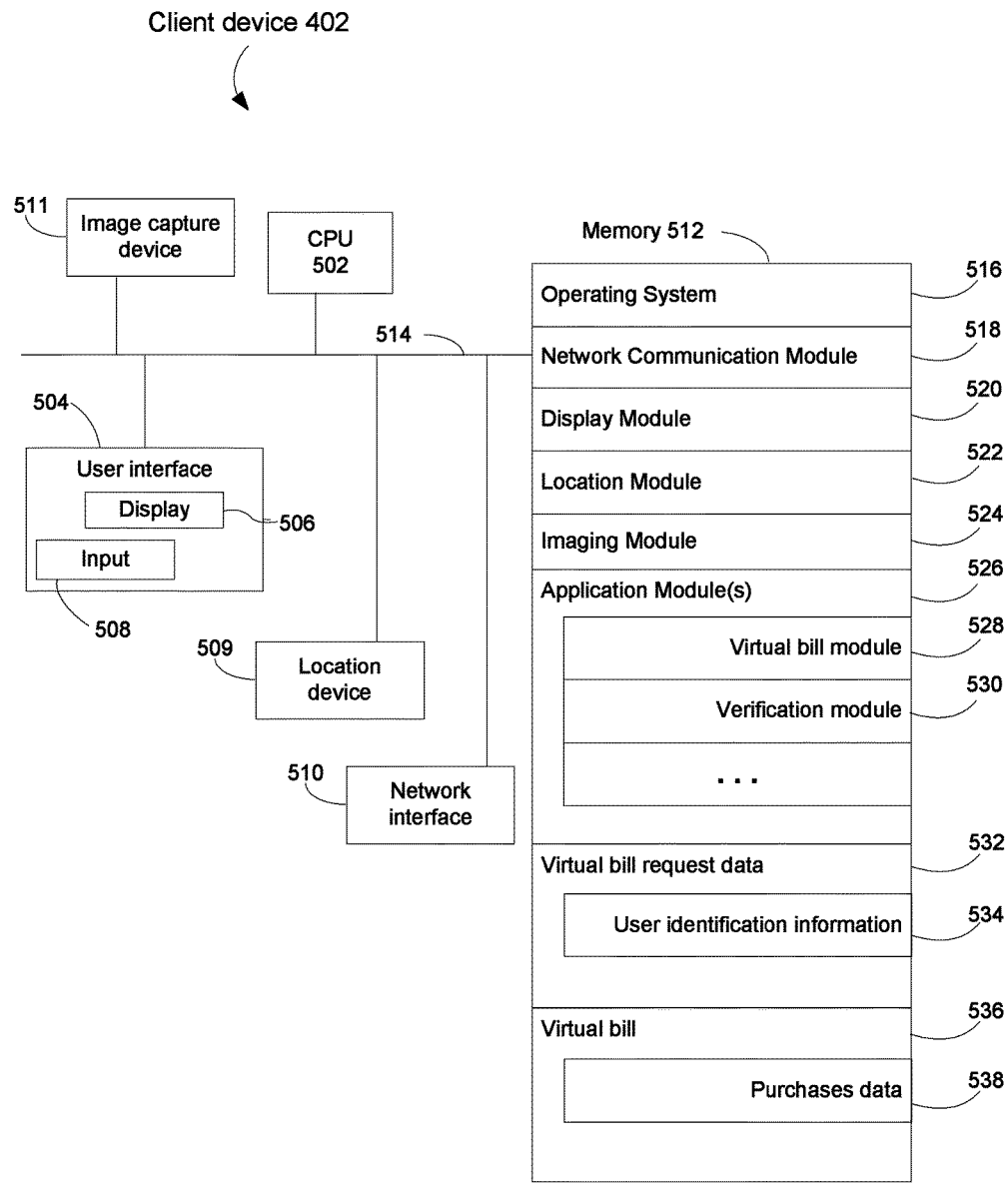
FIG. 5 is a block diagram illustrating a client device according to some embodiments.

FIG. 5 is a block diagram illustrating a client device 402 in accordance with some embodiments. The client device 402 typically includes one or more processing units (CPU's) 502, one or more network interfaces 510, memory 512, and one or more communication buses 514 for interconnecting these components. The client device 402 includes a user interface 504. The user interface 504 includes an associated display device 506 and one or more input devices 508 (e.g., keyboard, mouse, a touch-sensitive display, other input buttons). The client device 402 also optionally includes a location device 509 (e.g., a Global Positioning System module) for determining a location of the client device 402, and an image capture device 511 (e.g., a camera) for capturing images and/or video. Optionally, the client device 402 includes an audio device or other information delivery device. Optionally, the client device 402 includes a microphone and a voice recognition module to supplement or replace the keyboard.

Memory 512 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 512 may optionally include one or more storage devices remotely located from the CPU(s) 502. Memory 512, or alternately the non-volatile memory device(s) within memory 512, includes a non-transitory computer readable storage medium. In some implementations, memory 512 or the computer readable storage medium of memory 512 stores the following programs, modules and data structures, or a subset thereof:

an operating system 516 that includes procedures for handling various basic system services and for performing hardware dependent tasks;

a network communication module 518 that is used for connecting the client device 402 to other computers and devices via the one or more communication network interfaces 510 (wired or wireless) and one or more communication networks, such as the Internet, other wide area networks, local area networks, metropolitan area networks, ad-hoc wireless networks, and so on;

a display module 520 for enabling display of information on a display 506 associated with the client device 402;

optionally a location module 522 for determining the location of the client device 402 using data from location device 509, Wi-Fi location information, cell tower triangulation, close-proximity communication (e.g., near field communication) with other devices, and other suitable methods;

optionally an imaging module 524 for capturing, in conjunction with the image capture device 522, images and/or videos;

one or more application module(s) 526 for enabling the client device 402 to perform the functions offered by the client device 402, including but not limited to:
  a virtual bill module 528 for making requests to open and close a virtual bill 536, receiving purchases data 538 from seller terminals 506, and recording purchases data 538 to a virtual bill 536; and
  a verification module 530 for receiving verification requests, receiving inputs of verification information responsive to verification requests, and sending verification information;

virtual bill request data 532, which includes the data needed for making virtual bill requests, including user identification information 534, which is information that identifies the user with the payment service server system 410 (e.g., identifies a user account in the payment service hosted by the payment service server system 410).

In some embodiments, the virtual bill request data 532 is encoded as a barcode (e.g., a QR code).

In some embodiments, the client device 402 includes one or more biometric devices for obtaining user biometrics, such as fingerprint scanners. In some embodiments, the client device 402 includes one or more modules that, in conjunction with any of the devices and modules described above, obtain user biometrics (e.g., a facial scan module that works with the image capture device 511 and imaging module 524 to obtain user facial data).

Figure 6:
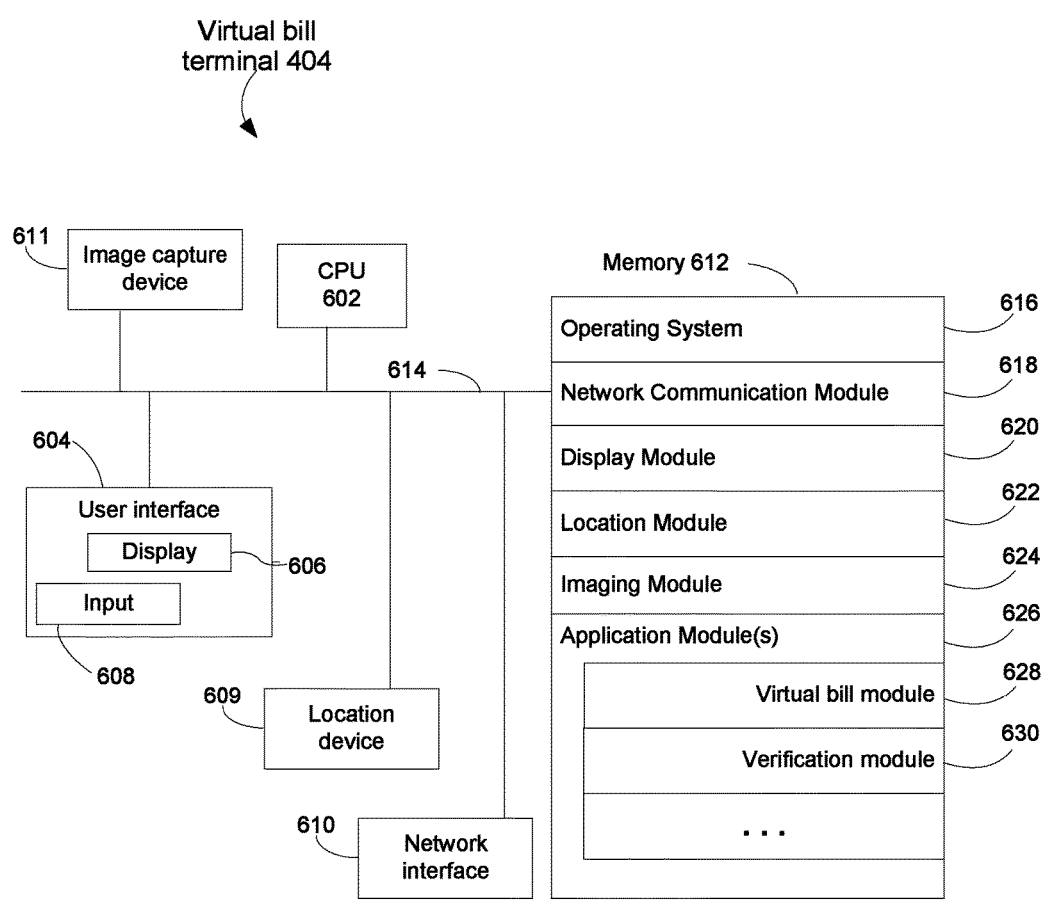
FIG. 6 is a block diagram illustrating a virtual bill terminal according to some embodiments.

FIG. 6 is a block diagram illustrating a virtual bill terminal 404 in accordance with some embodiments. The virtual bill terminal 404 typically includes one or more processing units (CPU's) 602, one or more network interfaces 610, memory 612, and one or more communication buses 614 for interconnecting these components. The virtual bill terminal 404 includes a user interface 604. The user interface 604 includes an associated display device 606 and optionally one or more input devices 608 (e.g., keyboard, mouse, a touch-sensitive display, other input buttons). The virtual bill terminal 404 also optionally includes a location device 609 (e.g., a Global Positioning System module) for determining a location of the virtual bill terminal 404, and an image capture device 611 (e.g., a camera) for capturing images and/or video. Optionally, the virtual bill terminal 404 includes an audio device or other information delivery device. Optionally, the virtual bill terminal 404 includes a microphone and a voice recognition module to supplement or replace the keyboard.

Memory 612 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 612 may optionally include one or more storage devices remotely located from the CPU(s) 602. Memory 612, or alternately the non-volatile memory device(s) within memory 612, includes a non-transitory computer readable storage medium. In some implementations, memory 612 or the computer readable storage medium of memory 612 stores the following programs, modules and data structures, or a subset thereof:

an operating system 616 that includes procedures for handling various basic system services and for performing hardware dependent tasks;

a network communication module 618 that is used for connecting the virtual bill terminal 404 to other computers and devices via the one or more communication network interfaces 610 (wired or wireless) and one or more communication networks, such as the Internet, other wide area networks, local area networks, metropolitan area networks, ad-hoc wireless networks, and so on;

a display module 620 for enabling display of information on a display 606 associated with the virtual bill terminal 404;

optionally a location module 622 for determining the location of the virtual bill terminal 404 using data from location device 609, Wi-Fi location information, cell tower triangulation, close-proximity communication (e.g., near field communication) with other devices, and other suitable methods;

optionally an imaging module 624 for capturing, in conjunction with the image capture device 622, images and/or videos;

one or more application module(s) 626 for enabling the virtual bill terminal 404 to perform the functions offered by the virtual bill terminal 404, including but not limited to:
  a virtual bill module 628 for receiving requests to open and close virtual bills, receiving and recording purchases data, and communicating virtual bill data with third party service server 410; and
  a verification module 630 for sending verification requests, receiving verification information responsive to verification requests, and sending verification information to third party service server 410.

Figure 7:
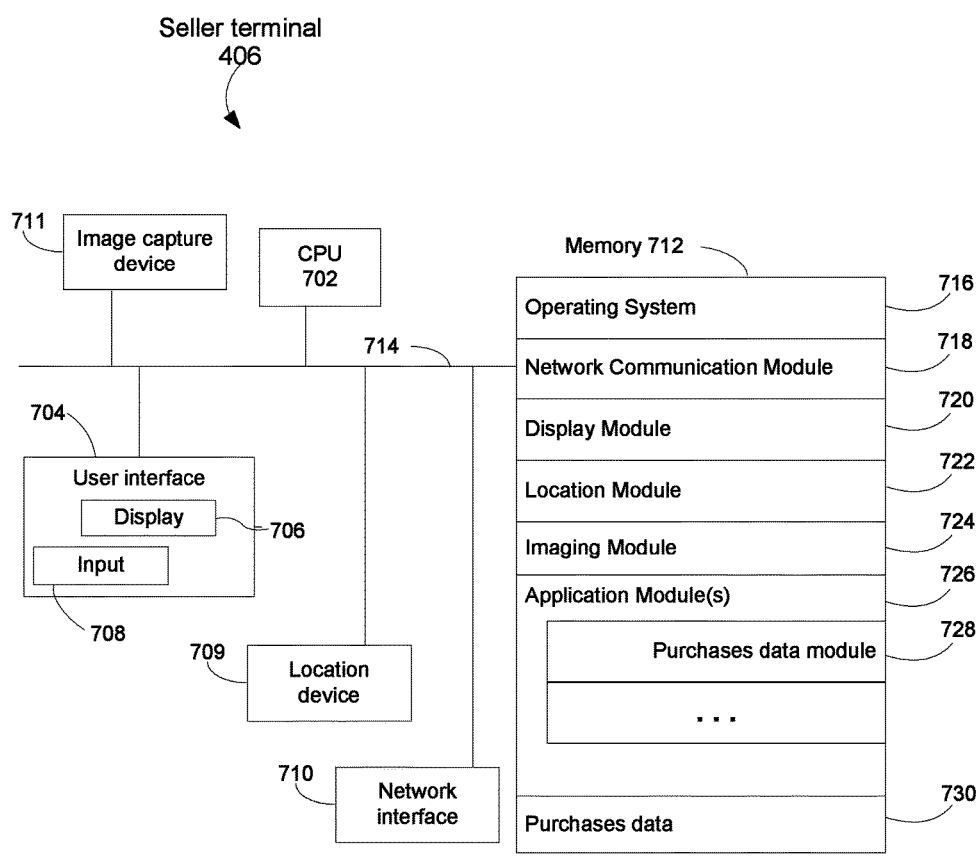
FIG. 7 is a block diagram illustrating a seller terminal according to some embodiments.

FIG. 7 is a block diagram illustrating a seller terminal 406 in accordance with some embodiments. The seller terminal 406 typically includes one or more processing units (CPU's) 702, one or more network interfaces 710, memory 712, and one or more communication buses 714 for interconnecting these components. The seller terminal 406 includes a user interface 704. The user interface 704 includes an associated display device 706 and optionally one or more input devices 708 (e.g., keyboard, mouse, a touch-sensitive display, other input buttons). The seller terminal 406 also optionally includes a location device 709 (e.g., a Global Positioning System module) for determining a location of the seller terminal 406, and an image capture device 711 (e.g., a camera) for capturing images and/or video. Optionally, the seller terminal 406 includes an audio device or other information delivery device. Optionally, the seller terminal 406 includes a microphone and a voice recognition module to supplement or replace the keyboard.

Memory 712 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 712 may optionally include one or more storage devices remotely located from the CPU(s) 702. Memory 712, or alternately the non-volatile memory device(s) within memory 712, includes a non-transitory computer readable storage medium. In some implementations, memory 712 or the computer readable storage medium of memory 712 stores the following programs, modules and data structures, or a subset thereof:

- an operating system 716 that includes procedures for handling various basic system services and for performing hardware dependent tasks;
- a network communication module 718 that is used for connecting the seller terminal 406 to other computers and devices via the one or more communication network interfaces 710 (wired or wireless) and one or more communication networks, such as the Internet, other wide area networks, local area networks, metropolitan area networks, ad-hoc wireless networks, and so on;
- a display module 720 for enabling display of information on a display 706 associated with the seller terminal 406;
- optionally a location module 722 for determining the location of the seller terminal 406 using data from location device 709, Wi-Fi location information, cell tower triangulation, close-proximity communication (e.g., near field communication) with other devices, and other suitable methods;
- optionally an imaging module 724 for capturing, in conjunction with the image capture device 722, images and/or videos;
- one or more application module(s) 726 for enabling the seller terminal 406 to perform the functions offered by the seller terminal 406, including but not limited to:
  - a purchases data module 728 for providing purchases data 730 to client devices 102; and
- purchases data 730 that includes data on a particular item or data on purchases by a user from the seller with which the seller terminal 406 is associated.

Figure 8:
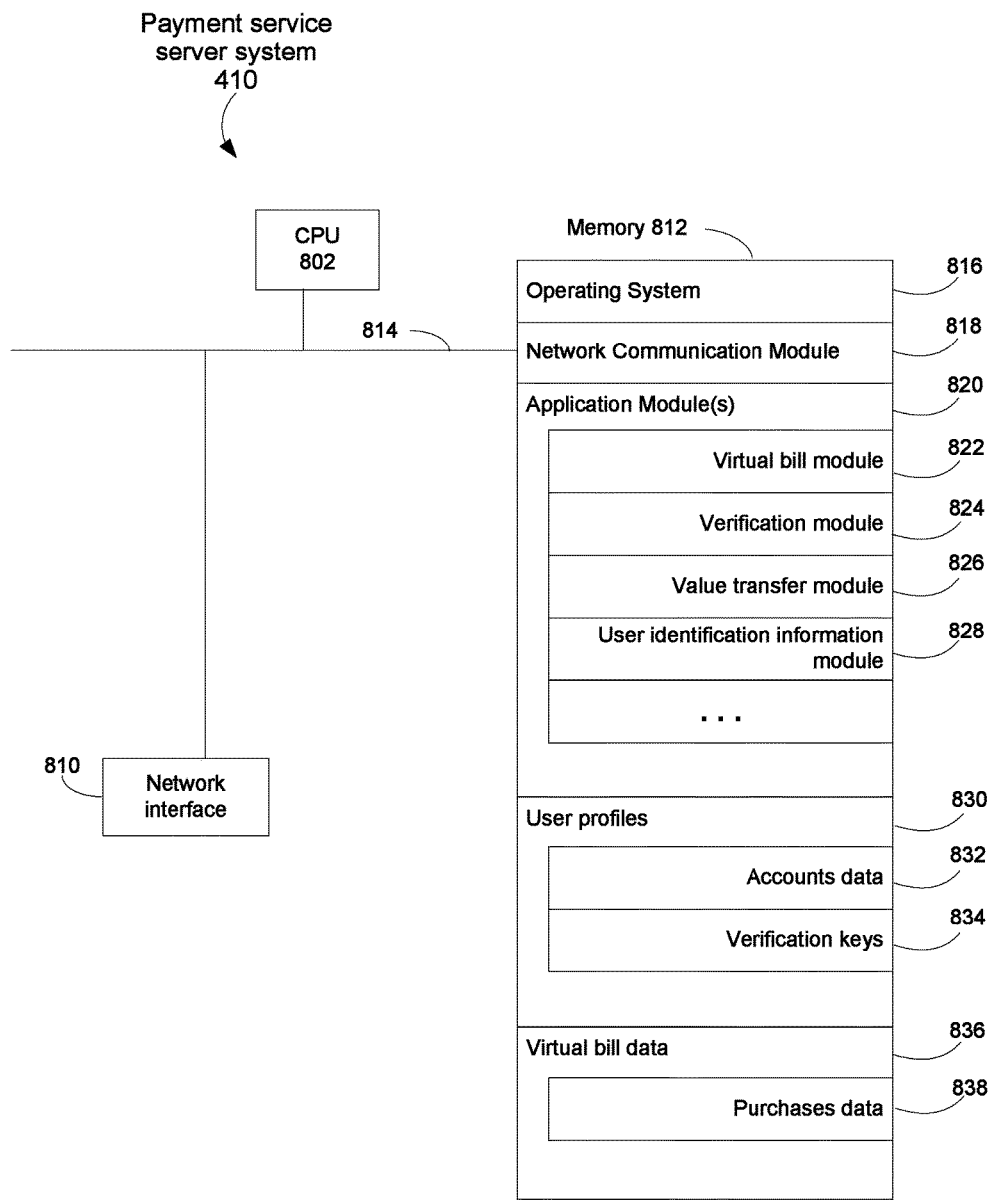
FIG. 8 is a block diagram illustrating a payment service server system according to some embodiments.

FIG. 8 is a block diagram illustrating a payment service server system 410 in accordance with some embodiments. The payment service server system 410 typically includes one or more processing units (CPU's) 802, one or more network interfaces 810, memory 812, and one or more communication buses 814 for interconnecting these components.

Memory 812 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 812 may optionally include one or more storage devices remotely located from the CPU(s) 802. Memory 812, or alternately the non-volatile memory device(s) within memory 812, includes a non-transitory computer readable storage medium. In some implementations, memory 812 or the computer readable storage medium of memory 812 stores the following programs, modules and data structures, or a subset thereof:

- an operating system 816 that includes procedures for handling various basic system services and for performing hardware dependent tasks;
- a network communication module 818 that is used for connecting the payment service server system 410 to other computers and devices via the one or more communication network interfaces 810 (wired or wireless) and one or more communication networks, such as the Internet, other wide area networks, local area networks, metropolitan area networks, ad-hoc wireless networks, and so on;
- one or more application module(s) 820 for enabling the payment service server system 410 to perform the functions offered by the payment service server system 410, including but not limited to:
  - a virtual bill module 822 for receiving and processing virtual bill data 834; and
  - a verification module 824 for receiving verification information and determining if received verification information is valid;
  - a value transfer module 826 for transferring value from users' accounts (e.g., to a escrow account associated with the payment service) and transferring value to sellers; and
  - user identification information module 828 for generating user identification information, which are provided to client devices 402 for identifying the users associated with them;
- user profiles 830 that store data corresponding to respective user accounts within the payment service, including accounts 832 of information corresponding to bank accounts and the like of users, and verification keys 834 for verifying user identities to access and transfer value from bank accounts and the like; and
- virtual bills data 836, which includes data of open and closed virtual bills, including respective purchase data 838 that indicates purchases made and amounts of the purchases.

Figure 9A:
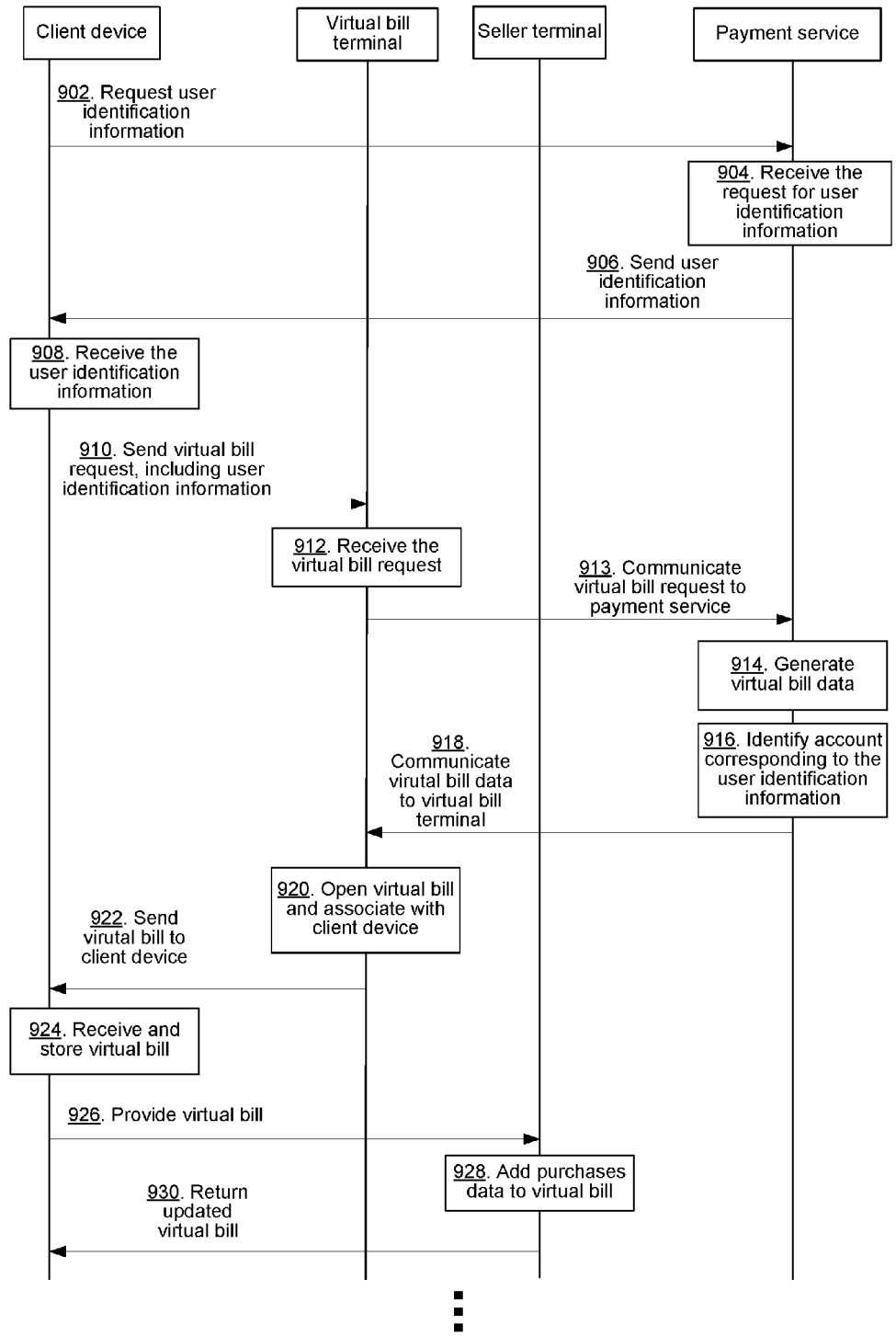
FIGS. 9A-9B is a flow diagram of a data batch processing method according to some embodiments.
Figure 9B:
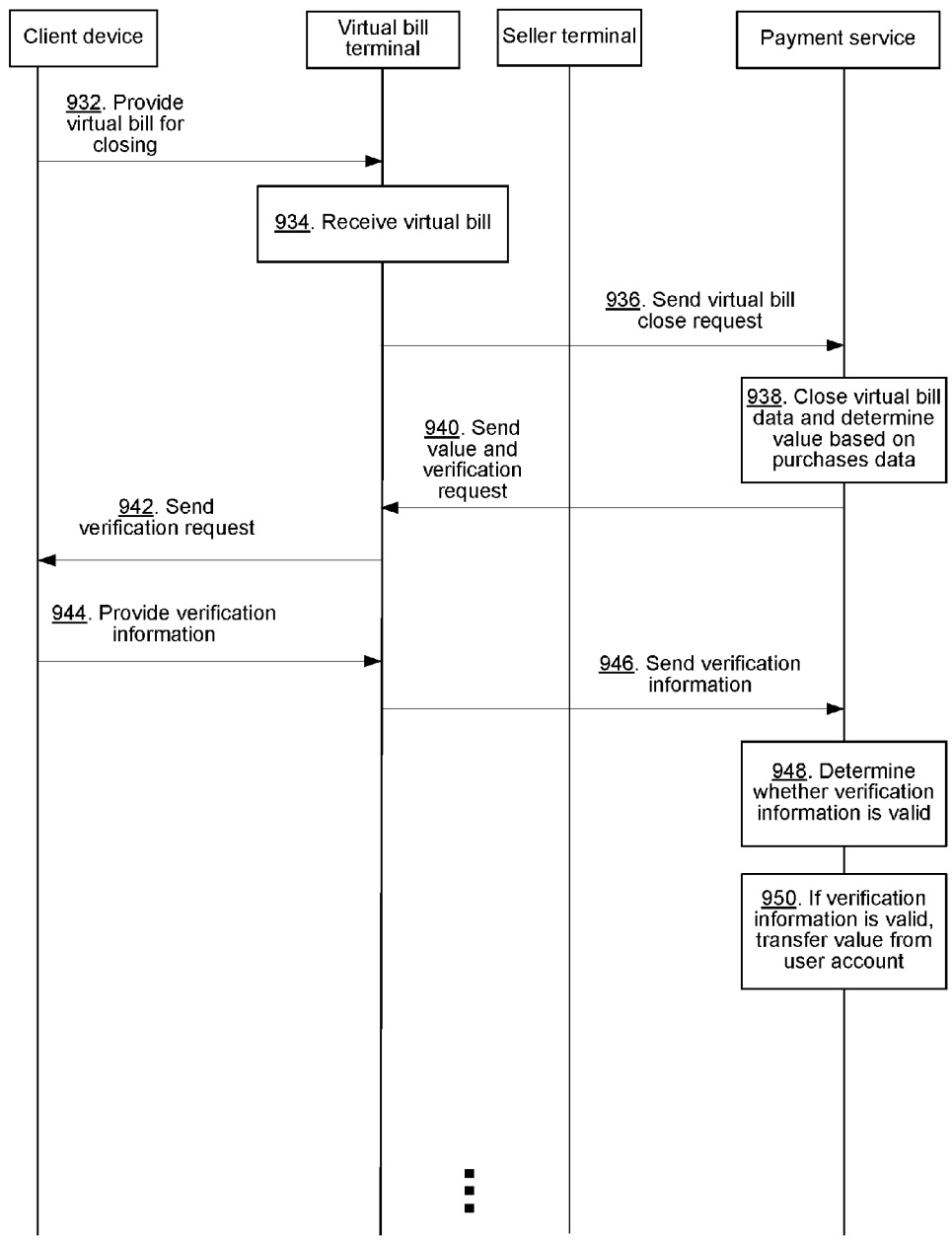

FIGS. 9A-9B is a flow chart of a data batch processing method according to some embodiments. The method described in FIGS. 9A-9B is described from multiple sides: a client device associated with a user (e.g., a client device 402 associated with a user making purchases from multiple sellers), a virtual bill terminal (e.g., virtual bill terminal 404), a seller terminal (e.g., a seller terminal 406) associated with a seller, and a payment service (e.g., a payment service hosted by payment service server system 410).

When the user shops with multiple sellers, the user first gets a virtual bill opened by having his client device 402 communicate with a virtual bill terminal 404. In some embodiments, before the client device 402 communicates with the virtual bill terminal 404, the client device 402 requests user identification information from the payment service (902). The client device 402 sends a request for user identification information to the payment service server system 410. The payment service server system 410 receives the request for user identification information (904) and sends the user identification information to the client device 402 (906). The user identification information includes data that identifies the user account, within the payment service, of the user with which the client device 402 is associated. In some embodiments, the user identification information sent to the client device 402 is encoded and optionally encrypted. In some embodiments, the user identification information sent to the client device 402 includes a timestamp.

The client device 402 receives and stores the user identification information 534 (908). In some embodiments, the user identification information 534 is used to generate a barcode for a virtual bill request. In some other embodiments, the user identification information is included in a virtual bill request transmitted wirelessly (e.g., by near field communication).

The client device 402 (e.g., the virtual bill module 528) sends a virtual bill request 532, which includes the user identification information 534, to a virtual bill terminal 404 (910). The virtual bill request 532 is a request to open a virtual bill associated with the client device 402 (and with the user). In some embodiments, the virtual bill request 532 is sent as a barcode; the virtual bill request 532 is displayed as a barcode on the display 506 of the client device and scanned by the virtual bill terminal 404. In some other embodiments, the virtual bill request 532 is sent wirelessly to the virtual bill terminal 404 (e.g., by near field communication, by Bluetooth, by Wi-Fi Direct).

The virtual bill terminal 404 receives the virtual bill request 532 (912). In some embodiments, the virtual bill module 628 receives the virtual bill request 532 by scanning a barcode displayed on the client device 402. In some other embodiments, the virtual bill module 628 receives the virtual bill request 532 by wireless communication (near field communication, etc.) with the client device 402. In some embodiments, the virtual bill request further includes user identification information identifying a second user associated with the respective seller terminals. In response, the payment service generates a relationship between the user associated with the client device and the second user associated with the respective seller terminals. In some embodiments, the virtual bill request is embedded in a text message from the user associated with the client device to the second user associated with the respective seller terminals.

In some embodiments, the virtual bill terminal 404 rejects the virtual bill request if a time elapsed from the time indicated in a timestamp in the user identification information to the time of receipt of the virtual bill request exceeds a threshold. In this case, the client device 402 may repeat steps 902-908 to get user identification information with a new timestamp and then make a new virtual bill request.

In some embodiments, the virtual bill request is communicated to the payment service (913). For example, the virtual bill terminal 404 forwards the virtual bill request to the payment service server system 410. The virtual bill module 822 receives the virtual bill request and generates corresponding virtual bill data (914). In some embodiments, the virtual bill has a predefined effective time period (e.g., two hours). As will be described below, the purchase transactions within the predefined effective time period are deemed to be valid and the purchase transactions outside the predefined effective time period are deemed to be invalid.

In some embodiments, the payment service identifies an account corresponding to the user identification information (916). The payment service server system 410 identifies, in the user profiles 830, the user account that corresponds to the user identification information (and by extension, the user with which the client device 402 is associated), and an account (e.g., bank account) associated with that user account.

The virtual bill data is communicated back to the virtual bill terminal (918), which then opens the virtual bill in accordance with the virtual bill request and associates the virtual bill with the client device 402 (920).

In some embodiments, the virtual bill is a data object to which additional data, such as purchases data, can be added. Thus, the virtual bill, in some embodiments, is similar to a virtual shopping cart or tab or invoice or bill.

The virtual bill terminal sends the opened virtual bill 536 to the client device 402 (922). The virtual bill module 528 receives and stores the virtual bill 536 (924).

After the virtual bill is opened, the user can proceed with purchases from various sellers. As the user makes purchases, the user's client device 402 communicates with multiple seller terminals 406. A respective seller terminal 406 is associated with a respective seller. A seller is associated with multiple seller terminals 406. In some embodiments, a seller terminal provides item information, such as the price, selling weight, unit price, and so on, for an individual item available for purchase; the seller terminal is digital signage for the item. In these embodiments, the purchases data for an item includes a value (the price) for the item.

In some other embodiments, a seller terminal is like a checkout counter for the associated seller; the user totals up the purchases just for that seller at the seller terminal. In these embodiments, the purchases data includes a value that is the total price of the items purchased from the respective seller.

Thus, the purchases data in the virtual bill includes data corresponding to one or more items that the user is purchasing, whether seller terminals respectively provide data on respective individual items or purchases with respective sellers.

For a respective seller terminal 406, in some embodiments, the client device 402 provides the virtual bill to the seller terminal 406 (926). For example, the virtual bill module 528 sends the virtual bill 536 to the seller terminal through wireless communication (near field communication, Bluetooth, Wi-Fi Direct, etc.). The seller terminal 406 receives the virtual bill 536, and the purchases data module 728 adds purchases data 730 to the virtual bill 536 (928). The seller terminal 406 returns (930) the updated virtual bill 536, which now includes purchases data 730, back to the client device 402 by sending the updated virtual bill 536 to the client device 402 through wireless communication.

In some other embodiments, the seller terminal 406 displays its purchases data 730 as a barcode on its display device 706. The client device 402 receives the purchases data 730 by scanning the barcode displayed on the display device 706. The client device 402 decodes the scanned barcode into the purchases data 730 and adds the purchases data to virtual bill 536. In this case, the virtual bill 536 need not be transmitted to the seller terminal 406 and back.

The client device 402 may repeat steps 926-930 and/or the barcode scanning, as described above, with multiple seller terminals 406 to get purchases data for the user's purchases from the respective seller devices 406 in order to add the purchases data to the virtual bill 536. In some embodiments, the multiple seller terminals are associated with distinct respective sellers. For example, the user may be shopping at a mall where there are multiple distinct sellers, each of which has one or more seller terminals. The user can use his client device to communicate with any number of these seller terminals to add purchase data to a virtual bill on the client device.

It should be appreciated that both the wireless communication (near field communication, Bluetooth, Wi-Fi Direct, etc.) and the barcode scanning described above are examples of close-proximity communication between the client device 402 and a seller terminal 406, communications in which the client device 402 and the seller terminal 406 are in relatively close distance from each other. The maximum allowable distance between the client device 402 and the seller terminal may be a limitation of the technique used for the communication (e.g., the maximum Bluetooth or Wi-Fi Direct range, the maximum distance at which a barcode of particular dimensions can be scanned clearly).

When the user is done shopping, the virtual bill needs to be closed, so that the total value of the purchases can be determined and paid for. The client device 402 provides the virtual bill 536, which includes purchases data 538 from the user's purchases from the sellers, to the virtual bill terminal

404 (932). For example, the client device 402 sends the virtual bill 536 to the virtual bill terminal 404 wirelessly (e.g., near field communication, Bluetooth, Wi-Fi Direct). Alternatively, the client device 402 encodes the virtual bill 536 into a barcode that is displayed on the display device 506, and the barcode is scanned by the virtual bill terminal 404.

The virtual bill terminal 404 receives the virtual bill (934) (e.g., wirelessly or by barcode scanning, as described above). The virtual bill terminal 404 sends a virtual bill close request to the payment service server system 410 (936). The close request includes the virtual bill.

The payment service server system 410 receives the close request, closes the virtual bill in response, and determines a value based on the purchases data in the closed virtual bill (938). In some embodiments, the determined value is the total price of the purchases in the purchases data that are within the predefined effective time window, i.e., what the user needs to pay to make the purchases recorded in the purchases data.

In some other embodiments, the virtual bill terminal 404 closes the virtual bill and sends the closed virtual bill to the payments service server system 410, in lieu of a virtual bill close request. The payments service server system 410 determines a value based on the purchases data in the closed virtual bill.

The payment services server system 410 sends the determined value and a verification request to the virtual bill terminal 404 (940). The virtual bill terminal 404 sends the verification request (and the value) to the client device 402 (942). The client device 402 displays the value and a prompt for verification information to the user in accordance with the verification request. The prompt may include, for example, a prompt for a password with a password field, a prompt for biometrics, and so on.

The use inputs verification information responsive to the verification request into the client device 402 in response to the verification request, and the client device 402 provides the verification information responsive to the verification request to the virtual bill terminal 404 (944). The client device 402 can send the verification information to the virtual bill terminal wirelessly, for example. The virtual bill terminal 404 sends the verification information to the payment service server system 410 (946).

In some embodiments, the verification information includes one or more of a password and one or more of the user's biometrics (e.g., fingerprint, voice print, facial scan, retinal scan).

In some other embodiments, the virtual bill terminal 404 displays the value and a prompt (to the user) for verification information on its display 606, in lieu of sending the request to the client device 402. The user inputs the verification information into the virtual bill terminal 404 instead of inputting the verification information into the client device 402.

In further other embodiments, the payment service server system 410 sends the verification request and the value to the client device 402, bypassing the virtual bill terminal 404. Verification information input at the client device 402 is sent to the payment service server system 410, bypassing the virtual bill terminal 404.

The payment service server system 410 determines whether the received verification information is valid (948), i.e., if the verification information matches the verification keys for the account associated with the user (e.g., the password is correct, the fingerprint matches the fingerprint on file for the user).

If the verification information is determined to be valid, payment service server system 410 initiates a transfer of the determined value (e.g., an amount of money or other unit of payment equal to or corresponding to the determined value) from the account (e.g., bank account) associated with the user. In some embodiments, the value is transferred to an escrow account (e.g., an escrow account associated with the payment service), where the value can be divided and distributed to the sellers from which the user purchased items.

If the verification information is determined to be not valid, steps 940 thru 948 may be repeated to give the user another opportunity to enter valid verification information. Alternatively, the users' purchases may be aborted.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method, comprising:
    at a system including a client device associated with a first user account registered with a social networking platform, and a virtual bill terminal configured to manage virtual bills, wherein the client device is configured to communicate with the virtual bill terminal and a plurality of seller terminals via respective close proximity data communication, the plurality of seller terminals associated with a plurality of seller accounts respectively registered with the social networking platform, and wherein the virtual bill terminal is communicatively connected to a server configured to support the social networking platform including a payment service:
        receiving, by the virtual bill terminal from the client device via close proximity data communication, a virtual bill request, the virtual bill request including user identification information identifying the first user account associated with the client device;
        in accordance with the virtual bill request and at the virtual bill terminal, activating a virtual bill and associating the virtual bill with the user identification information of the first user account, the virtual bill having a predefined effective time period;
        receiving the virtual bill from the virtual bill terminal and rendering the virtual bill on the client device;
        recording, on the client device, data corresponding to a plurality of items added to the virtual bill, wherein the plurality of items are added to the virtual bill using the client device from the plurality of seller terminals via proximity data communication between the client device and the plurality of seller terminals respectively, and wherein the plurality of items are added to the virtual bill by the first user account from the plurality of seller accounts respectively using the payment service on the social networking platform;
        after recording all data corresponding to the plurality of items to the virtual bill, receiving, by the bill terminal from the client device via close proximity data communication, the data corresponding to the plurality of items added to the virtual bill, wherein the plurality of items were added to the virtual bill within the predefined effective time period through respective close proximity data communication between the client device and the plurality of respective seller terminals, and wherein the plurality of items includes a first item added to the virtual bill through communication with a first seller terminal associated with a first seller account registered with the social networking platform, and a second item added to the virtual bill through communication with a second seller terminal associated with a second seller account registered with the social networking platform;
        determining, by the virtual bill management terminal, a value based on the data corresponding to the plurality of items;
        sending, from the bill management terminal to the client device, a verification request, wherein the verification request includes the determined value;
        receiving, from the client device, verification information responsive to the verification request; and
        in accordance with a determination that the verification information is valid, transferring, from the virtual bill terminal to the server, the determined value and initiating a transfer of the determined value from an account associated with the first user account.

2. The method of claim 1, wherein the virtual bill request further includes user identification information identifying the first seller account associated with the first seller terminal of the plurality of respective seller terminals, the method further comprising:
    generating a relationship between the first user associated with the client device and the first seller account associated with the first seller terminal on the social networking platform.

3. The method of claim 2, wherein the virtual bill request is embedded in a text message from the first user account associated with the client device to the first seller account associated with the first seller terminal.

4. The method of claim 1, wherein receiving the virtual bill request comprises obtaining information encoded in a barcode displayed on a display device of the client device.

5. The method of claim 1, wherein the verification information comprises one or more of: a password and one or more biometrics associated with the user.

6. The method of claim 1, wherein respective close proximity data communication includes any of: scanning a barcode, near-field communication, Bluetooth communication, and Wi-Fi communication.

7. The method of claim 1, wherein the user identification information includes a timestamp, the method further comprising:
    when a time elapsed since the user identification information timestamp exceeds a predefined time threshold, rejecting the virtual bill request.

8. The method of claim 1, wherein the verification request further includes itemized values of the plurality of items corresponding to respective purchases, each respective purchase having a respective timestamp.

9. The method of claim 8, wherein determining the value based on the data corresponding to the plurality of items comprise totaling the respective values of the respective purchases.

10. The method of claim 8, wherein the respective purchases are associated with distinct respective sellers.

11. A computer system, comprising:
memory;
one or more processors; and
one or more programs, wherein the one or more programs are stored in the memory and configured to be executed by the one or more processors, the one or more programs comprising instructions for:
receiving, by a virtual bill terminal from a client device via close proximity data communication, a virtual bill request, the virtual bill request including user identification information identifying a first user account associated with the client device, the first user account registered with a social networking platform, wherein the client device is configured to communicate with the virtual bill terminal and a plurality of seller terminals via respective close proximity data communication, the plurality of seller terminals associated with a plurality of seller accounts respectively registered with the social networking platform, and wherein the virtual bill terminal is communicatively connected to a server configured to support the social networking platform including a payment service;
in accordance with the virtual bill request and at the virtual bill terminal, activating a virtual bill and associating the virtual bill with the user identification information of the first user account, the virtual bill having a predefined effective time period;
receiving the virtual bill from the virtual bill terminal and rendering the virtual bill on the client device;
recording, on the client device, data corresponding to a plurality of items added to the virtual bill, wherein the plurality of items are added to the virtual bill using the client device from the plurality of seller terminals via proximity data communication between the client device and the plurality of seller terminals respectively, and wherein the plurality of items are added to the virtual bill by the first user account from the plurality of seller accounts respectively using the payment service on the social networking platform,
after recording all data corresponding to the plurality of items to the virtual bill, receiving, by the bill terminal from the client device via close proximity data communication, the data corresponding to the plurality of items added to the virtual bill, wherein the plurality of items were added to the virtual bill within the predefined effective time period through respective close proximity data communication between the client device and the plurality of respective seller terminals, and wherein the plurality of items includes a first item added to the virtual bill through communication with a first seller terminal associated with a first seller account registered with the social networking platform, and a second item added to the virtual bill through communication with a second seller terminal associated with a second seller account registered with the social networking platform;
determining, by the virtual bill management terminal, a value based on the data corresponding to the plurality of items;
sending, from the bill management terminal to the client device, a verification request, wherein the verification request includes the determined value;
receiving, from the client device, verification information responsive to the verification request; and
in accordance with a determination that the verification information is valid, transferring, from the virtual bill terminal to the server, the determined value and initiating a transfer of the determined value from an account associated with the first user account.

12. The computer system of claim 11, wherein receiving the virtual bill request comprises obtaining information encoded in a barcode displayed on a display device of the client device.

13. The computer system of claim 11, wherein the verification information comprises one or more of: a password and one or more biometrics associated with the user.

14. The computer system of claim 11, wherein respective close proximity data communication includes any of: scanning a barcode, near-field communication, Bluetooth communication, and Wi-Fi communication.

15. The computer system of claim 11, wherein the verification request further includes itemized values of the plurality of items corresponding to respective purchases, each respective purchase having a respective timestamp.

16. A non-transitory computer readable storage medium storing one or more programs configured for execution by a computer system that includes one or more processors and memory, the one or more programs comprising instructions to:
receiving, by a virtual bill terminal from a client device via close proximity data communication, a virtual bill request, the virtual bill request including user identification information identifying a first user account associated with the client device, the first user account registered with a social networking platform, wherein the client device is configured to communicate with the virtual bill terminal and a plurality of seller terminals via respective close proximity data communication, the plurality of seller terminals associated with a plurality of seller accounts respectively registered with the social networking platform, and wherein the virtual bill terminal is communicatively connected to a server configured to support the social networking platform including a payment service;
in accordance with the virtual bill request and at the virtual bill terminal, activating a virtual bill and associating the virtual bill with the user identification information of the first user account, the virtual bill having a predefined effective time period;
receiving the virtual bill from the virtual bill terminal and rendering the virtual bill on the client device;
recording, on the client device, data corresponding to a plurality of items added to the virtual bill, wherein the plurality of items are added to the virtual bill using the client device from the plurality of seller terminals via proximity data communication between the client device and the plurality of seller terminals respectively, and wherein the plurality of items are added to the virtual bill by the first user account from the plurality of seller accounts respectively using the payment service on the social networking platform,
after recording all data corresponding to the plurality of items to the virtual bill, receiving, by the bill terminal from the client device via close proximity data communication, the data corresponding to the plurality of items added to the virtual bill, wherein the plurality of items were added to the virtual bill within the predefined effective time period through respective close proximity data communication between the client device and the plurality of respective seller terminals, and wherein the plurality of items includes a first item added to the virtual bill through communication with a first seller terminal associated with a first seller account registered with the social networking platform, and a second item added to the virtual bill through communication with a second seller terminal associated with a second seller account registered with the social networking platform;

determining, by the virtual bill management terminal, a value based on the data corresponding to the plurality of items;

sending, from the bill management terminal to the client device, a verification request, wherein the verification request includes the determined value;

receiving, from the client device, verification information responsive to the verification request; and in accordance with a determination that the verification information is valid, transferring, from the virtual bill terminal to the server, the determined value and initiating a transfer of the determined value from an account associated with the first user account.

17. The non-transitory computer readable storage medium of claim 16, wherein receiving the virtual bill request comprises obtaining information encoded in a barcode displayed on a display device of the client device.

18. The non-transitory computer readable storage medium of claim 16, wherein the verification information comprises one or more of: a password and one or more biometrics associated with the user.

19. The non-transitory computer readable storage medium of claim 16, wherein respective close proximity data communication includes any of: scanning a barcode, near-field communication, Bluetooth communication, and Wi-Fi communication.

20. The non-transitory computer readable storage medium of claim 16, wherein the verification request further includes itemized values of the plurality of items corresponding to respective purchases, each respective purchase having a respective timestamp.

* * * * *